United States Patent [19]

Freidin

[11] Patent Number: 4,933,837

[45] Date of Patent: Jun. 12, 1990

[54] METHODS AND APPARATUS FOR OPTIMIZING INSTRUCTION PROCESSING IN COMPUTER SYSTEMS EMPLOYING A COMBINATION OF INSTRUCTION CACHE AND HIGH SPEED CONSECUTIVE TRANSFER MEMORIES

[75] Inventor: Philip Freidin, Sunnyvale, Calif.

[73] Assignee: Advanced Micro Devices, Inc., Sunnyvale, Calif.

[21] Appl. No.: 936,193

[22] Filed: Dec. 1, 1986

[51] Int. Cl.[5] .......................... G06F 9/00; G06F 13/00
[52] U.S. Cl. .............................. 364/200; 364/243.42; 364/239.4; 364/254.3; 364/263.1
[58] Field of Search ... 364/200 MS File, 900 MS File

[56] References Cited

U.S. PATENT DOCUMENTS

| | | | |
|---|---|---|---|
| 3,896,419 | 7/1975 | Lange et al. | 364/200 |
| 4,313,158 | 1/1982 | Porter et al. | 364/200 |
| 4,315,312 | 2/1982 | Schmidt | 364/200 |
| 4,437,149 | 3/1984 | Pomerene et al. | 364/200 |
| 4,442,488 | 4/1984 | Hall | 364/200 |

Primary Examiner—Gareth D. Shaw
Assistant Examiner—Christina M. Eakman
Attorney, Agent, or Firm—Lowe, Price, Leblanc, Becker & Shur

[57] ABSTRACT

Methods and apparatus are set forth for optimizing the performance of instruction processors using an instruction cache memory in combination with a sequential transfer main memory. According to the invention, the memory system stores preselected instructions in cache memory. The instructions are those that immediately follow a branch operation. The purpose of storing these instructions is to minimize, and if possible, eliminate the delay associated with fetching the same sequence from main memory following a subsequent branch to the same instruction string. The number of instructions that need to be cached (placed in cache memory) is a function of the access time for the first and subsequent fetches from sequential main memory, the speed of the cache memory, and instruction execution time. The invention is particularly well suited for use in computer systems having RISC architectures with fixed instruction lengths.

21 Claims, 3 Drawing Sheets

| ADDRESS | LABEL | INSTRUCTION |
|---|---|---|
| 100 | START | ADD |
| 101 | | LOAD CTR WITH 20 |
| 102 | LOOP | ADD |
| 103 | | DIV |
| 104 | | SUB |
| 105 | | MUL |
| 106 | | OR |
| 107 | | AND |
| 108 | | DJNZ LOOP |
| 109 | | ADD |
| 110 | | SUB |
| ⋮ | | ⋮ |

Fig. 3a

| ADDRESS | VALIDITY BITS | INSTRUCTION |
|---|---|---|
| 102 | 1000 | ADD |
| | | |
| | | |
| | | |

Fig. 3b

| 102 | 1100 | ADD |
|---|---|---|
| | | DIV |
| | | |
| | | |

Fig. 3c

| 102 | 1111 | ADD |
|---|---|---|
| | | DIV |
| | | SUB |
| | | MUL |

METHODS AND APPARATUS FOR OPTIMIZING INSTRUCTION PROCESSING IN COMPUTER SYSTEMS EMPLOYING A COMBINATION OF INSTRUCTION CACHE AND HIGH SPEED CONSECUTIVE TRANSFER MEMORIES

BACKGROUND OF THE INVENTION

1. Field of the Invention

This invention relates generally to computer systems that process instructions at a high rate of speed and more particularly relates to computer systems that utilize a combination of an instruction cache memory and consecutive transfer memory, with separate instruction and data paths, to improve the computer system's instruction processing capabilities.

2. Description of the Related Art

The instruction processing capabilities of prior art computer systems were generally limited by the relatively slow speed of their central processing units (CPUs) as compared with the higher speed of traditionally available memories. Today, CPUs, also referred to hereinafter as instruction processors, are typically as fast as, if not faster then, their companion memory systems. Accordingly, the cycle time of the memory system has become the limiting factor with respect to optimal resource utilization.

In an attempt to provide computer architectures which support high speed processing applications, well known computer systems have been developed which employ a relatively small proportion of expensive, very high speed memory, commonly referred to as cache memory, in combination with a larger, lower cost memory that has a slower random access time. Caches that may contain both instructions and data are called "combined caches". They may alternatively be designed to contain only instructions, or data, called respectively an "instruction cache" and a "data cache". The principal purpose of the instruction cache is to provide a vehicle for supplying the processor with instructions faster then they could otherwise be had via accessing the slower main memory over separate memory cycles. Cache memory systems are known that, for example, commonly operate in the 30 ns range; while the slower main memory referred to hereinbefore typically has a cycle time that is on the order of 150 ns, i.e. is approximately five times slower then cache memory. However, cache memory, because of the aforesaid cost factor, may comprise as little as only a fraction of one percent of total memory.

Traditional computer systems have used cache memories to maintain a copy of the most recently used instructions fetched from slower main memory. When instruction fetches are required, the processor first looks in the cache for the instruction. This is accomplished by matching the instruction address with a tag that is stored in the cache alongside the saved instruction. If the comparison succeeds, the instruction is fetched from the cache, and the processor can continue. This is generally referred to as a "cache hit". If there is no copy of the required instruction in the cache (i.e. no tag matches the required address), a "cache miss" is signaled, and the instruction is fetched from main memory. The processor then has to wait for the instruction to be returned. When the instruction is returned, the cache stores it for future use, with a tag to indicate the address of where the instruction came from.

Because the cache is of limited size, when a cache miss occurs, and the instruction is fetched from memory and stored into the cache, some other instruction already in the cache will be overwritten. The decision of which cache location(s) is (are) to be overwritten is generally made by using a replacement algorithm.

The selection of such an algorithm will obviously affect system performance. However, because the same performance tradeoffs apply to both traditional caches and the cache used in accordance with the teachings of the invention (hereinafter disclosed), and because these performance characteristics are not germane to the teaching of the invention per se, they are not discussed further herein. Furthermore, since replacement algorithms are well known to those skilled in the art, including such techniques as overwriting the oldest block of information stored in the cache memory, overwriting the statistically least used data stored in cache memory, etc., likewise, these alogorithms will not be further discussed herein except to the extent they affect managing the disclosed memory system.

Most modern main frame computers employ an instruction cache or combined caches in combination with a slower main memory. Examples include the Digital Equipment Corporation (DEC) VAX, the DEC PDP-11 and the Data General MV 8000.

Other computer systems are known which combine an instruction cache with a slower memory having sequential transfer characteristics. An example of such systems are the Fairchild CLIPPER micro-computer and the Zilog Z80,000.

It has been recognized that, in computer systems having separate instruction and data paths, it is possible to take advantage of memories having sequential transfer characteristics to improve system performance. Such memories can perform sequential transfers much faster than the time required for separate memory cycle accesses. The sequential transfers are initiated by a normal address sent to the memory system, and a read is initiated. The access time for this read is the characteristic nonsequential access time. Again, in standard semiconductor dynamic memories, this access time is of the order of 150 ns. Successive instruction fetches can then occur until either a branching instruction (jump, conditional jump, call, return, or other sequence modifying instruction) is executed, or an interrupt occurs. A new sequence of sequential instructions is then executed. These sequential transfer memories are also synonymously referred to hereinafter as "memories optimized for sequential transfers".

The separate instruction and data paths referred to hereinbefore are necessary to avoid collisions of requests for instructions, and data read/write transfers that would otherwise break the sequential nature of the transfer of instructions.

After the first instruction is fetched, the memory system can be instructed to fetch sequential instructions. The access time for these fetches in standard semiconductor dynamic memory systems is of the order of 50 ns. Such speeds approximate cache memory speeds.

Prior art systems which use cache memory and sequential transfer memory together, although experiencing improved performance with respect to cache plus nonsequential transfer memories, still suffer from not making the most effective possible use of the cache resource. This is because, as indicated hereinbefore, consecutive transfer memory systems have different access times depending on the mode of access, e.g., 150 ns for initial fetches versus 50 ns for sequential fetches. Therefore, to save all new references in the cache memory and continually check for cache hits would be a gross waste of resources when the sequential transfer memory is "up to speed".

It would be desirable to be able to use the cache memory resource in conjunction with a sequential transfer memory in a way that eliminates the processor waiting time associated with the long time (e.g. 150 ns) required to access sequential transfer memory following instruction discontinuities, e.g., following branch instructions. Once the sequential memory is back "up to speed", i.e., operating in the 50 ns range, the cache resource could then conceptually be kept in reserve to potentially speed up processing in the face of subsequent branch instructions.

In addition, it has been recognized, in accordance with the desire expressed hereinabove, that RISC (reduced instruction set computer) architectures may be particularly well suited to benefit from the use of the cache resource in conjunction with a sequential transfer memory. This is because; (1) RISC in-line code has been statistically shown to have relatively fewer branch instructions as compared with code running on other computer systems; and (2) RISC architectures lend themselves to fixed length instruction codes (though not invariably the case) which can easily be translated into the size of an optimal cache memory instruction block, and which in turn can be used to feed the instruction processor while the sequential transfer memory is performing its relatively long, initial access.

The current commercial availability of sequential transfer memory chips and other sequential transfer memory systems, which in certain modes of operation are as effective (in terms of speed) as the cache resource, further suggests the desirability of optimizing the use of the cache resource along the lines expressed hereinabove.

SUMMARY OF THE INVENTION

Methods and apparatus are set forth for optimizing the performance of instruction processors using an instruction cache memory in combination with a sequential transfer main memory. According to the invention, the novel memory system stores preselected instructions in cache memory. The instructions are those that immediately follow a branch operation. The purpose of storing these instructions is to minimize, and if possible eliminate, the delay associated with fetching the same sequence from main memory following a subsequent branch to the same instruction string. The number of instructions that need to be cached (placed in cache memory) is a function of the access times for the first and subsequent fetches from sequential main memory, the speed of the cache memory, and instruction execution time.

Although not required, the preferred embodiment of the invention contemplates a RISC arthcitecture with fixed length instructions. To be useful, the invention requires that the average number of sequential instructions between successive branch instructions, exceed the number of instructions that need to be cached. If this criterion is not met there is no average gain on the delay otherwise suffered, waiting for a full initial sequential transfer memory cycle to be complete.

It is a principal object of the invention to make optimal use of the instruction cache resource in a combined cache/sequential transfer memory system.

It is a further object of the invention to reduce and whenever possible eliminate the delay in instruction processing associated with the initial accessing of the aforementioned sequential transfer memories, particularly as it relates to the processing of branch instructions.

It is still a further object of the invention to provide methods and apparatus which optimally utilize memory resources in fixed length instruction RISC architectures employing combined cache/sequential transfer memory systems.

It is yet another object of the invention to provide a computer system that places only a preselected set of instructions satisfying preselected criteria into cache memory.

The invention features a computer system that makes more efficient use of its cache memory as the average number of in-line instructions between potential code discontinuities increases.

The invention also features methods and apparatus that are ideally suited to support fixed length instruction processing in RISC environments. These same methods and apparatus are easily adapted to support nonfixed length and/or non RISC architecture related instruction processing.

Additionally, the invention features the freedom to utilize a multiplicity of well known cache related algorthims, such as placement and replacement algorithms, in conjunction with the teachings herein for the selective utilization of the cache resource. It will be appreciated by those skilled in the art that the primary focus in this disclosure is the selective caching of instructions; not on how information is placed into cache memory nor how it is used or removed therefrom.

These and other objects and features of the present invention will become apparent to those skilled in the art upon consideration of the following detailed description and the accompanying Drawing, in which like reference designations represent like features throughout the figures.

BRIEF DESCRIPTION OF THE DRAWING

FIGS. 3a–3c depict how the code sequence of FIG. 2 would be utilized in conjunction with the memory depicted in FIG. 1b to realize the objectives of the invention.

DETAILED DESCRIPTION

Figure 1A:
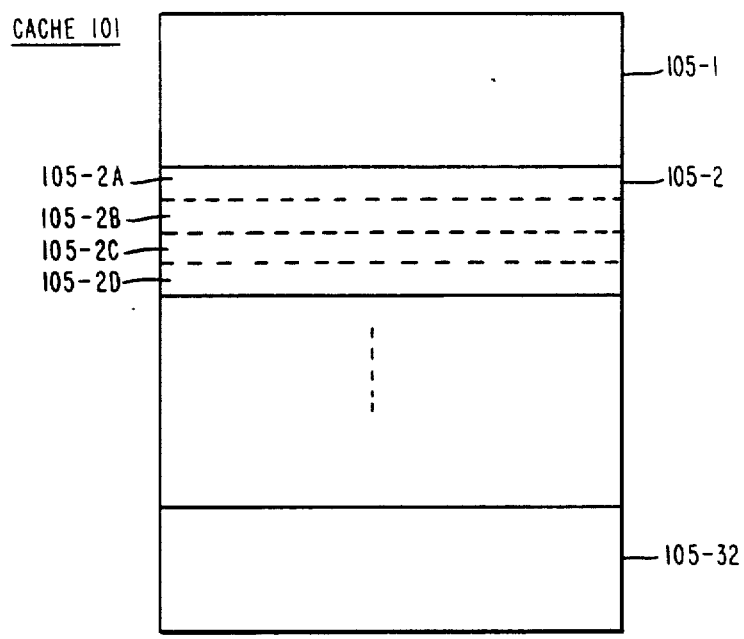
FIG. 1a depicts the overall organization of an instruction cache memory suitable for use in accordance with the preferred embodiment of the invention.

FIG. 1a depicts an instruction cache memory, 101, also referred to hereinafter as a "branch target cache", which, according to the preferred embodiment of the invention, is capable of storing 128, 32 bit instructions. The preferred cache is also capable of storing address information which tells the processor where the first instruction stored in a cache block came from in main memory. Additionally, validity information related to each instruction is stored in cache memory. The use of 32 bit instructions, the presumption of fixed length instructions, and the choice of a cache size to be able to store the information described hereinabove, is for the sake of illustration only. It will be demonstrated hereinafter how, for example, variable length instructions could be used with the disclosed methods and apparatus.

Further, for the sake of illustration and in accord with the preferred embodiment of the invention, the cache depicted in FIG. 1a, is shown segmented into 32 blocks, 105-1, 105-2, ..., 105-32, where each block is designed to hold 4 instructions. Multiplying 32 blocks times 4 instructions each yields the illustrative 128 instruction size cache. The address from which the first instruction in each block was fetched, together with the aforesaid validity information, is also stored in each block. The four "words" in cache memory that make up information block 105-2 are shown in FIG. 1a as words 105-2a through 105-2d.

Figure 1B:
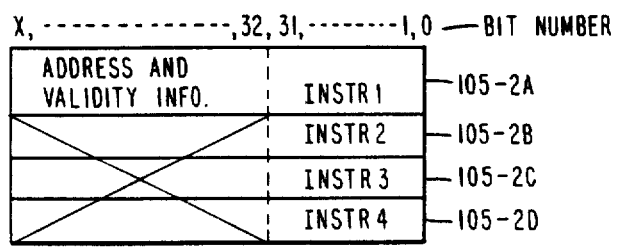
FIG. 1b depicts the format of a portion of the instruction cache memory, also organized in accordance with the preferred embodiment of the invention.

Block 105-2 of the branch target cache, as depicted in FIG. 1a, is shown in greater detail in FIG. 1b.

For the sake of illustration, FIB. 1b depicts bits 0 through 31 of each word in the cache block formated to hold a 32 bit instruction. These are depicted as INSTR1 through INSTR4 in FIG. 1b. Bits 32 through bit X of the first word of the block, are suitable for storing the aformentioned address and validity bit information. A specific example of how a branch target cache is used to optimize computer system performance will be described hereinafter with reference to FIGS. 2 and 3.

Figures 1C, 2:
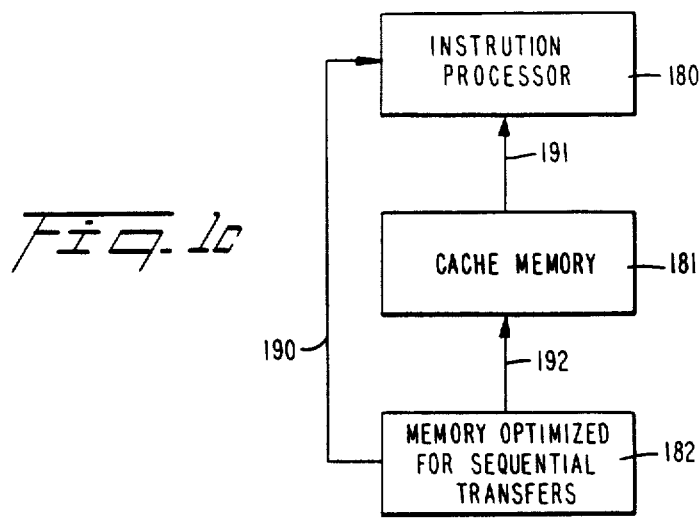
FIG. 1c depicts an overview of the combination of an instruction processor, instruction cache memory and memory optimized for sequential transfers, organized in accordance with the preferred embodiment of the invention.
FIG. 2 depicts a code sequence which is designed to illustrate the principals of the invention.

FIG. 1c depicts an overview of the combination of an instruction processor, instruction cache memory and memory optimized for sequential transfers, organized in accordance with the preferred embodiment of the invention. In particular, the instruction processor is shown as 180, the instruction cache as 181 and the memory optimized for sequential transfers is shown as 182. Units 180, 181 and 182 are shown interconnected via links 190, 191 and 192. The architecture in which the preferred embodiment of the invention is set permits instructions to be supplied to the instruction processor in two ways, either directly from memory 182 over link 190, or from cache memory 181 via link 191. In instances, to be described in detail hereinafter, where memory 182 supplies an instruction to memory 181 (via link 192) the instruction is also provided to processor 180 (via link 190). The arrangement depicted in FIG. 1c is set forth for the purpose of illustration only and could be varied by those skilled in the art without departing from the scope or spirit of the invention.

The novel memory system disclosed herein has already been described as comprising a combination of cache memory and sequential transfer memory resources used in a novel way. For the sake of completeness, an explanation of how to implement suitable sequential transfer memories is presented immediately hereinafter.

Suitable sequential transfer memories include, interleaved memory, nibble mode memory, page mode memory and video mode memory.

Interleaved memory systems are those architectures in which the memory is partitioned into several banks. These banks of memory are cycled under the control of a multiphase clock or a delay line, etc. Consecutive memory fetches come from different banks under control of the clock logic. If the cycle time of a memory bank is, for example, 200 ns, then, if there are 4 banks, the access time for an initial fetch is 200 ns, and all successive fetches would take 50 ns.

Nibble mode memory is a specific type of dynamic random access memory device (DRAM). Up to 4 consecutive reads can be performed from the device with the issuance of only one address. Access timing is of the order of 150 ns for the first read, and 30 ns for the successive reads.

Page mode memory is another specific type of DRAM. This type of memory has 2 distinct address transfer phases. During the first phase, a row address is transmitted to the DRAM chip, and during the second phase a column address is transmitted to the DRAM chip. The access time when both phases are performed is of the order of 150 ns. These devices may also be accessed by a single phase one, followed by multiple phase two address transmissions. In this case the access time for the first data is also 150 ns, but for consecutive reads that only have the second phase of the address (and use the previous first phase), the access time is of the order of 50 ns.

Finally, video mode memory is a specific type of dynamic random access memory device called a "VDRAM". VDRAMs were originally designed specifically for video display applications. With a processor that can request consecutive transfers, these devices can be used for main memory. This type of memory copies a complete row of data from the main memory array into a shift register structure (or equivalent RAM plus counter) and is then able to shift consecutive data out of the device when commanded. The access time for the first data is of the order of 150 ns and for the consecutive reads is of the order of 40 ns.

All of these memory architectures support consecutive transfers with a faster access time for the successive transfers. This ability is functionally similar to having the program counter register (PC register) external to the central processor. The processor must still maintain its own copy of the PC for support of interrupts and subroutine calls.

The processor of the novel computer system is assumed to have separate instruction and data paths. As a result, significant time can be saved by not having to transfer the PC register to the memory for every fetch of an instruction. The actual time to perform memory transfers also includes time through buffers, and address decode logic for large memory arrays. This will affect the access time for the initial transfer more than the successive transfers. Typical values are hereinafter assumed, for the sake of the remaining illustrations in this disclosure, to be about 200 ns for the first transfer, and 50 ns for the successive transfers from sequential transfer memory.

If the processor is able to execute a new instruction every 50 ns, then the types of memory systems described hereinabove are well suited (i.e., well matched), to the processor for sequential memory fetches of instructions. For these instruction fetches, a traditional cache memory, as explained hereinbefore, would not improve system performance.

Also, for the sake of the remaining illustrative examples in this disclosure, it is assumed that the branch target cache has a 50 ns instruction transfer rate, i.e., is four times faster then the initial access rate of its companion sequential transfer memory.

Before going further with the explanation of how the branch target cache depicted in FIGS. 1a and 1b may be optimally used, several further assumptions need to be made and explained.

As previously indicated, the instruction and data paths of the novel computer system are separate. This will avoid potential contention and overwrite problems. Additionally, as discussed hereinabove, this will enable the system to realize the efficiency of not having to transfer the PC register to memory for each fetch of an instruction.

It is also assumed that the memory system can perform sequential transfers faster than separate transfers, and at speeds that approximate cache memory speed. If this were not the case there would not be any advantage in using the techniques disclosed herein.

Furthermore, it is assumed that the processor can indicate that it is either requesting the first fetch of a sequential block, or a follow on sequential fetch. This, or an equivalent signal, is required to determine instances where a search for a cache hit is in order and when to initiate a long fetch from sequential memory.

Still further, it is assumed that the instruction processor can use instructions at the rate that the memory system can supply them. If this were not the case, it would be pointless to try and minimize memory system access times.

Finally, no self modifying programs are allowed to run on the novel system. Obviously, such programs with their potential for varying instructions at and/or following a branch point, raises to unaccepable levels the possibility that the instructions that would otherwise have been fetched from main memory.

Proceeding with the explanation of how a branch target cache may be optimally used in combination with sequential transfer memories, reference again should be made to FIG. 1b.

If, as assumed, the first fetch from main memory takes 200 ns, the sequential fetches take 50 ns, and the processor is matched to the sequential fetch rate, then the system would be configured as illustrated in FIG. 1b, i.e., the cache would be organized into blocks of 4 words each, with as many blocks as desired to achieve system cost and performance goals with respect to the cache hit/miss ratio. If, for example, the cache resource were 256 words versus the 128 words of the FIG. 1a cache, 64 blocks of information could be stored, etc.

When the instruction processor encounters a branch instruction (jump, conditional jump, call, return, etc.), the next instruction address is compared to the appropriate tags in the cache to see if the instruction following the branch is in the cache. If it is, then the instruction plus the next three instructions will be supplied from the cache block. While this is happening, the processor will issue an address to the memory system for an instruction which is four instructions ahead of the one being processed. While the processor is executing instructions from the cache block, the main memory is doing the long access time first fetch. By the time the processor has used up all the instructions in the cache block, the memory system will be ready with instructions to be fetched in sequential mode (fast access mode).

If the instruction following the branch is not in the cache, then the processor will issue the address of the required instruction. Both the cache and processor wait for the first fetch to return from the memory system. As the instructions start to arrive, the processor will start executing them, and the cache will store the first four instructions to arrive, i.e., the first fetch plus the next three sequential fetches, in the aforementioned blocks. Also, the cache will store the address associated with the first fetched instruction, together with validity information as each instruction arrives.

A specific example will now be set forth with reference to FIGS. 2 and 3. FIG. 2 depicts a code sequence which is designed to illustrate the principals of the invention. FIG. 3 depicts how the code sequence of FIG. 2 would be utilized in conjunction with the memory depicted in FIG. 1b to realize the objectives of the invention.

For the purpose of the illustrative example about to be presented, assume that the cache memory is initially empty, i.e., all bits are zero. Also assume that the code sequence (program) depicted in FIG. 2 is stored in main, sequential transfer type, memory in locations 100 through 110, inclusive. Location 100 is labeled "START", location 102 is labeled "LOOP" and the instructions may be seen to comprise arithmetic and logic instructions, together with a branch instruction "DJNZ LOOP" located at address 108. The DJNZ LOOP instruction causes a counter to be decremented, followed by a jump to instruction 102 if the counter is not zero. If the counter is zero following the decrement, the in-line code sequence continues.

To begin with, assume the instruction processor calls for the instruction at "start", i.e., the instruction at main memory address 100. 200 ns later, using the cycle time assumptions set forth hereinbefore, the instruction at address 100 arrives at the processor. The processor then executes this instruction (the ADD).

It should be noted that at this point, according to the teachings of the invention, the cache memory is not loaded with the ADD instruction. Only instructions following a code discontinuity, as will be observed hereinafter, are stored in cache memory thereby conserving the resource.

It should be further noted at this point that the sequential transfer memory, having just performed the long, 200 ns fetch, is now up to speed. Therefore, 50 ns later, the LOAD COUNTER instruction from address 101 arrives at the processor.

The sequence of in-line instructions following instruction 101, i.e., instruction 102 through the branch instruction at address 108, form the body of the loop which is executed and reexecuted for as long as the counter at the conclusion of executing the DJNZ instruction is non-zero.

On the first pass through the code sequence, instructions 102 through 108 are provided to the instruction processor sequentially (at the 50 ns rate) from main memory. After the DJNZ at location 108 is executed (assuming a non-zero counter) the processor will next want to process instruction 102, i.e., begin the second pass in the loop. Instruction 109 arrives from sequential memory, but will be discarded by the processor.

The processor is then, according to the invention, set up to search cache memory for the address tag corresponding to the instruction at the branch address. In the case of this example, the processor looks in the cache for the address associated with LOOP, i.e., address 102.

Those of ordinary skill in the art will readily appreciate that the processor can be itself programmed to perform such a search using, for example, well known micro code techniques, hardwire programming, associative memory, direct map techniques, etc. As such, the mechanics of setting the processor up to engage in the aforementioned search do not constitute a part of the invention per se.

At this point in time in the example, the processor will fail to find the tag associated with instruction 102 since the cache only contains zeros.

The processor then issues address 102 to main memory and waits 200 ns for the ADD instruction to be presented to the processor by the memory system. The ADD is executed and the instruction is simultaneoulsy stored into the first word of a cache block. This may be seen with reference to FIG. 3, part A, where a cache block is shown with "102" put into the address section of the first word in the cache block, a first validity bit is set, and the "ADD" instruction itself is placed in bits 0-31 of the first word.

Continuing with the example, 50 ns later, the "DIV" (divide) instruction is executed by the processor and the DIV instruction is stored in the second word (bits 0-31) of the cache block depicted in part B of FIG. 3. A second validity bit is shown as being set at this time as well. Similarly the SUB (subtract) instruction and the MUL (multiply) instruction are stored in the cache (and executed by the processor) following the next two 50 ns fetches from main memory. The final configuration of the cache block is shown as part C of FIG. 3.

At this point a preselected number of prefetched instructions (those at the beginning of the loop following the DJNZ) have been stored in cache memory. The preselected number in the example was 4 since the ratio of the access speed for an initial fetch from main memory (200 ns) and the cache speed (50 ns) is four to one.

All instructions were presummed to be of equal length. One of ordinary skill in the art will readily appreciate that for variable length instructions, the methods and apparatus taught herein would call for extra cache block space to accommodate storing the longest variable length instructions. The objective would be the same as the fixed word length case, i.e., to use the cache blocks to minimize or eliminate the delay otherwise suffered waiting for the initial fetch of an instruction following a code discontinuity.

To complete the example being set forth with reference to FIGS. 2 and 3, no further instructions would at this time be stored in the cache block shown in FIG. 3, part C, following the preselected 4 instructions discussed hereinbefore. The processor would continue sequential processing with instruction 106 (the LOGICAL OR instruction), instruction 107 and the DJNZ at location 108. Each of these would be fetched with 50 ns delays.

Following the DJNZ, still assumming a non-zero counter, instruction 109 would again be thrown away and the cache would be concurrently searched for the tag address associated with LOOP, i.e., address 102. A cache hit would be signalled since the tag is now in the cache block (see FIG. 3 part C) and all 4 validity bits are set. The processor now avoids the 200 ns delay associated with an initial fetch of the instruction at address 102 from main memory by requesting address 102 plus 4 (i.e., address 106) from the main memory. While waiting the 200 ns for the instruction at address 106 to be presented, the processor processes instruction 102 through 105 stored in cache block, thereby eliminating any waste of resources. When instruction 105 has been processed, instruction 106 is immediately thereafter ready to be processed and presented to the instruction processor. Further instructions are fetched from main memory at the sequential rate of 50 ns. This concludes the example with reference to FIG. 2 and 3.

Several possible policies for loading cache memory are briefly described hereinafter since they affect the number of validity bits incorporated into a branch target cache architecture which in turn affect the way the cache memory resource is managed.

According to the preferred embodiment of the invention, the basic policy for loading the cache is to load it whenever there is a cache miss. The replacement policy selection is a design decision that is handled as for traditional caches.

The management of the validity of a cache block is complicated by the problem that one of the instructions being stored into the block may cause a sequence discontinuity. For the sake of completeness, several possible management algorithms are described hereinafter.

With an "Always Fill" policy, the cache block is always filled with the sequential instructions, even if a branching instruction is embedded. This will have serious negative repercussions if the branch is always taken since the processor may have to wait while the block is filled, and the pre-fetch sequence will be started on an instruction sequence that will not be used.

With a "Throw Away Partial Blocks" policy, if the cache block is not filled by normal instruction references, the block is marked as invalid (i.e., the stored information is discarded) and the processor continues with the new instruction stream. This will also have serious negative repercussions as a cache block will be left unused, and will cause the original branch to always get a cache miss.

The preferred embodiment of the invention contemplates using a "Validity Bit Per Instruction" policy. In this policy, each instruction in the cache block has a validity bit associated with it. When a taken branch has a cache hit (i.e., a block is found with the appropriate tag) the instructions are fetched from the block. If all validity bits are set true, then the pre-fetch logic is started, otherwise it is not, as it would be pointless.

An alternate suitable policy would be a "Counter Field In Block" policy. In this policy, each cache block has a counter associated with it that indicates how many valid instructions there are in the cache block. If it is zero, the block is empty-invalid. For all other values, some or all of the block is valid, and the value indicates the amount to be added to the address that matched the tag to get the address that the pre-fetching should start at.

Depending on the policy for placing instructions into the cache, validity bits may be needed one per cache block, or one per instruction in a block, or a counter field. This is needed if there is a branch instruction in the cache block, such that the follow on instructions are not needed or requested. As a separate issue, a conditional branch after a branch may cause a branch on the first execution, thus leaving the rest of the cache block invalid, and then on a subsequent execution, it may not branch, and the cache block will not have the instructions required to continue. The resolution of these problems is a system design tradeoff decision and can use one of the above described policies, or some other policy desired by the designer.

As for the technology of implementation, the techniques described herein are not meant to be limited to a single implementation technology. VLSI implementations could be built with NMOS, CMOS, TTL, ECL or other semiconductor technology. LSI, MSI or even SSI implementations could also be built.

With respect to the architecture of implementations, the techniques described herein are not meant to be limited to a specific processor arthitecture, or memory architecture. Any processor architecture can be used, but it is worth nothing again that the RISC architectures, because of their single cycle execution times, are particularly well suited to the high speed sequential instruction fetch capability. Any of the previously described sequential memory systems could be used, or any other memory architecture that can support faster transfers for the sequential transfers from main memory.

Finally, as for the speed of various possible implementations, although the description given herein refers to memory systems with initial access time of 150 ns to 200 ns and successive access times of around 50 ns, the novel cache architecture disclosed herein can be applied to other memory/processor combinations that have an instruction fetch rate that is matched to the sequential access time, and a longer initial access time. For example, this architecture would work where the processor fetched an instruction every 10 ns, the initial access time for memory was 100 ns and the sequential access time was 10 ns. This would suggest a cache block size of 10 instructions per block where the cache operates with a 10 ns access time.

What has been described are methods and apparatus for optimizing the performance of an instruction processor using an instruction cache memory in combination with sequential transfer main memory. These methods and apparatus meet the objectives set forth hereinbefore.

The foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular used contemplated.

It is intended that the scope of the instant invention be defined by the claims appended hereto.

What is claimed is:

1. A computer system which improves the use of cache memory resources for instruction processing, comprising:
    (a) an instruction processor for initiating instruction requests and for executing requested instructions;
    (b) first memory means, for storing a set of instructions and connected to said instruction processor for providing requested ones of said instructions to said instruction processor sequentially until an instruction sequence discontinuity is recognized by said instruction processor, wherein said first memory means has a first instruction transfer latency, L, for transferring the initial instruction fetched by said instruction processor from a set of contiguous instructions following an instruction sequence discontinuity, and has a second instruction transfer latency, M, for transferring each remaining instruction in said set of contiguous instructions, where M corresponds to a function of the instruction fetch rate of said instruction processor and further wherein L is greater than M; and
    (c) second means, including an instruction cache memory connected to said instruction processor and to said first memory means, said second means having an instruction transfer latency M for each and every instruction transferred from said instruction cache memory to said instruction processor, said instruction cache memory operative for storing a plurality of blocks of instructions from said first memory means, each block containing a predetermined fixed number, X, of instructions following an instruction sequence discontinuity, wherein said predetermined fixed number belongs to the set of integers between and including the integral powers of two that bound the quotient of L divided by M;
    (d) wherein said instruction processor is operative upon occurrence of an instruction sequence discontinuity to fetch instructions from said instruction cache memory.

2. A computer system as set forth in claim 1 wherein said instruction processor, following an instruction sequence discontinuity, is further operative, on the occurrence of a cache hit, to fetch instructions from said instruction cache memory and said first memory means in parallel and further wherein the combined memories are operative to provide a continuous instruction stream to said instruction processor at the instruction processor's fetch rate thereby overcoming the latency associated with the initial fetch from said first memory means, while using only that portion of instruction cache memory required to store said predetermined fixed number of instructions.

3. A computer system as set forth in claim 1 wherein said instruction processor, following an instruction sequence discontinuity, is further operative, on the occurrence of a cache hit, to initiate fetches from both said first memory means and said instruction cache memory in parallel, where the address of the first instruction requested from said first memory means is the address in said first memory means of the instruction immediately following the last of the X instructions stored in the block in which the cache hit occurred.

4. A computer system as set forth in claim 1 in which the utilization of said instruction cache memory as compared with said first memory means is proportionately reduced as the average number of in-line instructions between instruction discontinuities, for the instructions stored in said first memory means, increases.

5. A computer system as set forth in claim 1 wherein the computer system architecture is a RISC architecture.

6. A computer system as set forth in claim 1 wherein each instruction has the same length.

7. A computer system as set forth in claim 6 wherein the computer system architecture is a RISC architecture.

8. A computer system as set forth in claim 1 wherein said instruction processor, following an instruction sequence discontinuity, is further operative, on the occurrence of a cache miss, to fetch instructions from said first memory means and store up to the first X instructions fetched from said first memory means in a given one of said cache blocks.

9. A computer system as set forth in claim 8 wherein said instruction processor, upon a cache miss, stores, in said given cache block, an address tag indicative of a location in said first memory means from which the first instruction in said given cache block was fetched.

10. A computer system as set forth in claim 9 wherein said instruction cache memory is further utilized to store a code indicative of the validity of the instructions stored in a given cache block by said instruction processor.

11. Apparatus for improving the performance of an instruction processor, where said instruction processor initiates instruction requests and executes requested instructions, comprising:

(a) first memory means, for storing a set of instructions and connected to said instruction processor for providing requested ones of said instructions to said instruction processor sequentially until an instruction sequence discontinuity is recognized by said instruction processor, wherein said first memory means has a first instruction transfer latency, L, for transferring the initial instruction fetched by said instruction processor from a set of contiguous instructions following an instruction sequence discontinuity, and has a second instruction transfer latency, M, for transferring each remaining instruction in said set of contiguous instructions, where M corresponds to a function of the instruction fetch rate of said instruction processor and further wherein L is greater than M; and (b) second means, including an instruction cache memory connected to said instruction processor and to said first memory means, said second means having an instruction transfer latency M for each and every instruction transferred from said instruction cache memory to said instruction processor, said instruction cache memory operative for storing a plurality of blocks of instructions from said first memory means, each block containing a predetermined fixed number, X, of instructions following an instruction sequence discontinuity, wherein said predetermined fixed number belongs to the set of integers between and including the integral powers of two that bound the quotient of L divided by M;

(c) wherein said instruction processor is operative upon occurrence of an instruction sequence discontinuity to fetch instructions from said instruction cache memory.

12. Apparatus as set forth in claim 11 wherein said instruction processor, following an instruction sequence discontinuity, is further operative, on the occurrence of a cache hit, to fetch instructions from said instruction cache memory and said first memory means in parallel and further wherein the combined memories are operative to provide a continuous instruction stream to said instruction processor at the instruction processor's fetch rate thereby overcoming the latency associated with the initial fetch from said first memory means, while using only that portion of instruction cache memory required to store said predetermined fixed number of instructions.

13. Apparatus as set forth in claim 11 wherein said instruction processor, following an instruction sequence discontinuity, is further operative, on the occurrence of a cache hit, to initiate fetches from both said first memory means and said instruction cache memory in parallel, where the address of the first instruction requested from said first memory means is the address in said first memory means of the instruction immediately following the last of the X instructions stored in the block in which the cache hit occurred.

14. Apparatus as set forth in claim 11 in which the utilization of said instruction cache memory as compared with said first memory means is proportionately reduced as the average number of in-line instructions between instruction discontinuities, for the instructions stored in said first memory means, increases.

15. Apparatus as set forth in claim 11 wherein said instruction processor, following an instruction sequence discontinuity, is further operative, on the occurrence of a cache miss, to fetch instructions from said first memory means and store up to the first X instructions fetched from said first memory means in a given one of said blocks.

16. Apparatus as set forth in claim 15 wherein said instruction processor, upon a, cache miss, stores, in said given block, an address tag indicative of a location in said first memory means from which the first instruction in said given block was fetched.

17. Apparatus as set forth in claim 16 wherein said instruction cache memory is further utilized to store a code indicative of the validity of the instructions stored in a given block by said instruction processor.

18. A method for improving the use of cache memory resources for instruction processing in a computer system that includes (a) an instruction processor, (b) first memory means connected to said instruction processor and operative for storing a set of instructions, wherein said first memory means has a first instruction transfer latency, L, for transferring the initial instruction fetched by said instruction processor from a set of contiguous instructions following an instruction sequence discontinuity, and has a second instruction transfer latency, M, for transferring each remaining instruction in said set of contiguous instructions, where M corresponds to a function of the instruction fetch rate of said instruction processor and further wherein L is greater than M, and (c) second memory means, including an instruction cache memory connected to said instruction processor and to said first memory means, said second memory means having an instruction transfer latency M for each and every instruction transferred from said instruction cache memory to said instruction processor, said instruction cache memory operative for storing a plurality of blocks of instructions from said first memory means, each block containing a predetermined fixed number, X, of instructions following an instruction sequence discontinuity, wherein said predetermined fixed number belongs to the set of integers between and including the integral powers of two that bound the quotient of L divided by M, comprising the steps of:

(a) storing said set of instructions in said first memory means;

(b) processing said instructions sequentially until an instruction sequence discontinuity is encountered;

(c) determining if the instruction at a branch address, Q, following said instruction sequence discontinuity is in one of said blocks in said instruction cache memory;

(d) fetching, upon a cache miss, instructions from said first memory means beginning at address Q and storing the first X instructions so fetched in one of said blocks in said instruction cache memory; and (e) fetching, upon a cache hit, instructions from said instruction cache memory and said first memory means in parallel in a manner which provides a continuous instruction stream to said instruction processor at the instruction processor's fetch rate thereby overcoming the latency associated with the initial fetch from said first memory means, using only that portion of the instruction cache memory required to store said predetermined fixed number of instructions.

19. A method as set forth in claim 18 wherein the step of fetching, upon a cache hit, is performed by said instruction processor initiating fetches from both said first memory means and said instruction cache memory in parallel, where the address of the first instruction requested from said first memory means is Q+X.

20. A method as set forth in claim 19 in which the utilization of said instruction cache memory as compared with said first memory means is proportionately reduced as the average number of in-line instructions between instruction discontinuities, for the instructions stored in said first memory means, increases.

21. A method for improving the performance of an instruction processor having a fetch rate of 1/M and a memory system that includes (1) a first memory means, having a transfer latency L for transferring the initial instruction fetched by said instruction processor from a set of contiguous instructions following an instruction sequence discontinuity, and a second instruction transfer latency, M, for transferring each remaining instruction in said set of contiguous instructions, where L is greater than M, and (2) second memory means, including an instruction cache memory, having an instruction transfer latency M for each and every instruction fetched from said instruction cache memory, combined with said first memory means, for storing a plurality of blocks of instructions, each block containing a predetermined fixed number, X, of requested instructions, wherein said predetermined fixed number belongs to the set of integers between and including the integral powers of two that bound the quotient of L divided by M; the method comprising the steps of:

(a) coupling said instruction processor to said first and second memory means; and (b) upon occurrence of a discontinuity in the instruction sequence and a cache hit, fetching instructions from said instruction cache memory and said first memory means in parallel in a manner which continuously makes instructions available to said instruction processor at the instruction processor fetch rate, 1/M.

* * * * *